United States Patent [19]

Piasecki

[11] Patent Number: 4,995,572

[45] Date of Patent: Feb. 26, 1991

[54] HIGH ALTITUDE MULTI-STAGE DATA ACQUISITION SYSTEM AND METHOD OF LAUNCHING STRATOSPHERIC ALTITUDE AIR-BUOYANT VEHICLES

[75] Inventor: Frank N. Piasecki, Haverford, Pa.

[73] Assignee: Piasecki Aircraft Corporation, Essington, Pa.

[21] Appl. No.: 361,274

[22] Filed: Jun. 5, 1989

[51] Int. Cl.$^5$ .............................................. B64C 37/02
[52] U.S. Cl. ........................................ 244/2; 244/24; 244/30; 244/33; 244/58; 244/140
[58] Field of Search ................... 244/2, 24, 30, 116, 244/58, 140, 33

[56] References Cited

U.S. PATENT DOCUMENTS

| | | | |
|---|---|---|---|
| 870,430 | 11/1907 | Hervé | 244/33 |
| 1,629,374 | 5/1927 | Avorio | 244/30 |
| 2,629,115 | 2/1953 | Hansen | 244/33 |
| 4,364,532 | 12/1982 | Stark | 244/30 |
| 4,366,936 | 1/1983 | Ferguson | 244/2 |
| 4,591,112 | 5/1986 | Piasecki et al. | 244/26 |
| 4,773,617 | 9/1988 | McCampbell | 244/24 |

FOREIGN PATENT DOCUMENTS 2452423 11/1986 France ............................ 244/30

Primary Examiner—Charles T. Jordan
Assistant Examiner—Rochelle Lieberman
Attorney, Agent, or Firm—Willard M. Hanger

[57] ABSTRACT

A multi stage high-altitude data acquisition system comprising a first stage manned lighter-than-air, engine propelled aircraft and a second stage air-buoyant vehicle of stratospheric altitude attaining capability statically sustainable aloft by a sufficient quantity of lighter-than-air gas contained within an expandable envelope balloon to carry the vehicle to a stratospheric float altitude and transportable from ground level to a tropospheric launching altitude by the first stage aircraft from which the air buoyant vehicle and its partially expanded gas containing envelope is releasable at the launching level while the first stage aircraft is established in a flight condition of substantially zero airspeed. The first stage aircraft preferably is a rigid type airship having a silo within an interior bay of the airship of dimensions and configurations as will retain within the airship the air-buoyant vehicle and its lifting gas envelope partially expanded to a volume displaced by the lifting gas at the lower troposphere launching altitude.

35 Claims, 4 Drawing Sheets

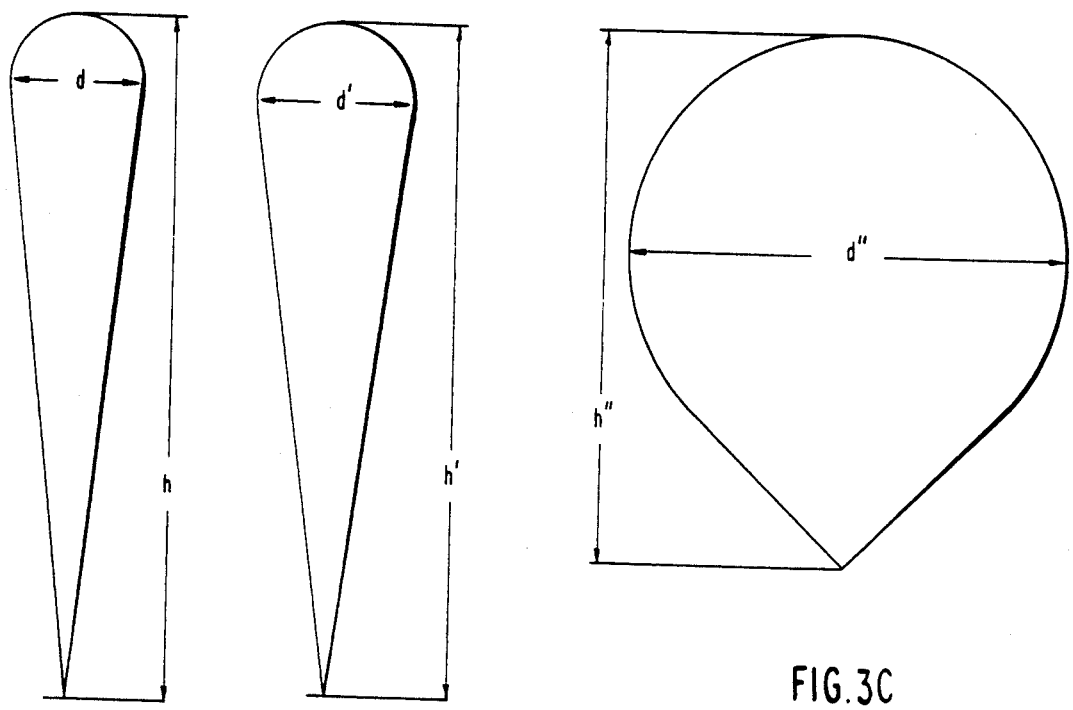
FIG.3A    FIG.3B
FIG.3C
FIG.4
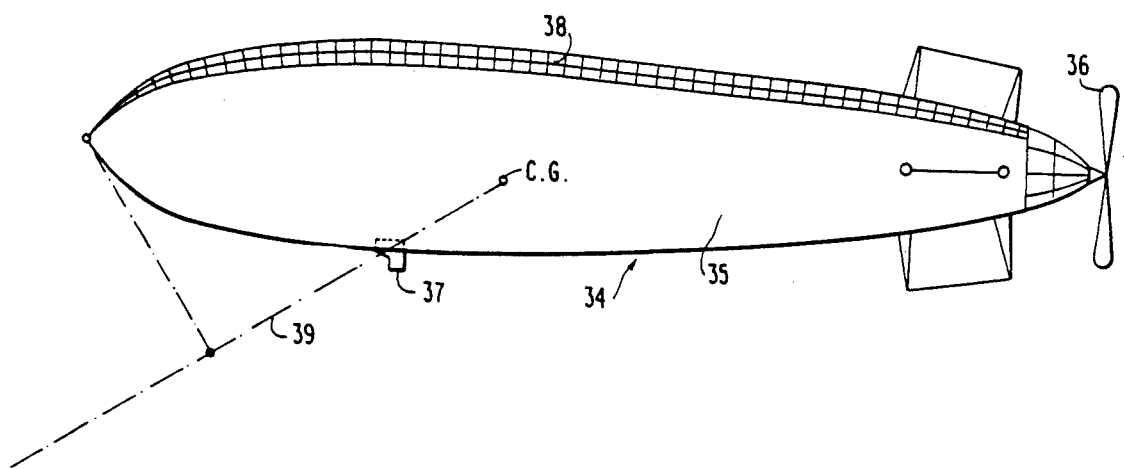

HIGH ALTITUDE MULTI-STAGE DATA ACQUISITION SYSTEM AND METHOD OF LAUNCHING STRATOSPHERIC ALTITUDE AIR-BUOYANT VEHICLES

BACKGROUND OF THE INVENTION

This invention relates to a method and a multi stage air-buoyant vehicle system (ABVS) for launching a surveillance platform that ascends into the upper air stratosphere region (above about 7 miles).

Stratospheric altitude platforms from which surveillance and sensor equipment of various types are supported for fulfilling missions such as upper air data acquisition, weather surveillance, outer space data acquisition, communication links, ballistic missile detection and tracking and defense system device actuation, etc. have long been in demand. Air breathing engine aircraft are altitude limited, rocket powered aircraft have limited endurance and satellites are expensive to launch and replace. Light weight balloon envelopes filled with a lighter-than-air gas, such as hydrogen or helium, are capable of ascending to stratospheric heights carrying moderate size payloads. In particular large volume, free balloons of very thin plastic material are relatively inexpensive, their launch time and positions are controllable, are capable of lifting equipment to stratospheric altitudes and have been successfully used at times for high altitude missions. However, high altitude balloons of light plastic fabric are extremely difficult to launch and have a poor record of successful ground launch operations due to their extreme sensitivity to even slight wind conditions. This is due to their very large size, the very light weight of the thin plastic of the envelopes at the top of which the small captive helium bubble is contained at the ground level launching site. The enormous side area of the "loose" envelope presents a large sail area that is easily affected by the lightest of wind gusts, particularly when the gusts come from different directions that is common in calm wind conditions, leading to tearing the thin plastic material so as to completely destroy the envelope at launch.

SUMMARY OF THE INVENTION

An object of the invention is to provide an air-buoyant vehicle system capable of launching and maintaining data sensing and surveillance devices at stratospheric altitudes.

A further object of the invention is to provide a two stage air-buoyant vehicle system by means of which large volume, high altitude air-buoyant platforms can be safely launched under controllable zero wind conditions.

Yet another object of the invention is to provide a two stage air-buoyant vehicle system in which a second stage air-buoyant vehicle capable of ascending to stratospheric altitudes is carried to and launched from a first stage air-buoyant vehicle at medium altitudes above ground level.

Yet still another object of the invention is to provide an improved method of launching high altitude free balloons.

A still further object of the invention is to provide a method of delivering an air-buoyant surveillance platform in two stages to stratospheric altitudes.

The foregoing and other objects of the invention are achieved in embodiments of the invention involving a system of two air-buoyant (lighter-than-air) vehicles (ABVS) that provide a novel and improved manner of launching an air-buoyant platform carrying sensor or surveillance equipment into the stratospheric regions for transmitting data to the ground. The ABVS system comprises an upper air-buoyant vehicle (UABV), or second stage vehicle, that ascends to a stratospheric region operational altitude with the sensor portion of the payload and a lower air-buoyant vehicle (LABV), or first stage vehicle, which carries the second stage UABV to a moderate troposphere altitude from which the second stage UABV is launched and which can control or monitor the second stage UABV. Preferably, the lower or first stage air-buoyant vehicle (LABV) comprises a manned, large, airship having vectored thrust provisions for establishing positive attitude and translational movement control at all air speeds from and above zero of which the Piasecki HELI-STAT airship (U.S. Trademark Registration 1,247,630) described in U.S. Pat. No. 4,591,112 and incorporated herein by reference is one suitable configuration.

The first stage LABV airship has a lifting gas volume capable of carrying one or more second stage UABV platforms to an altitude of moderately stable air, preferably about 10,000 to 12,000 feet or possibly even higher. German Zeppelin type airships of World War I were capable of reaching 25,000 feet. The lower, first stage airship (LABV) has provisions for carrying the second stage UABV platform either partially inflated at ground level or inflated in flight to the launching altitude from which the second stage UABV platform can be released and launched under essentially a zero wind condition by establishing the first stage LABV airship at a level attitude and substantially zero air speed. The expandable volume of the lifting gas container (i.e. envelope) of the second stage UABV is such it can ascend to the desired stratospheric float altitude levels.

The most simple and inexpensive type of second stage UABV vehicle would be a free balloon of light weight plastic from which the sensor pay load hangs and can be either tethered to the first stage launching LABV or permitted to float freely. More sophisticated second stage UABV platform vehicles equipped with a self contained power thruster could be substituted for the free balloon type of second stage UABV platform.

Other objects and advantages of the invention will become more fully apparent from the following more detailed description and the appended drawings which illustrate preferred embodiments of the invention.

DRAWINGS

FIG. 1 schematically illustrates various phases of the high altitude, two stage vehicle launching system of the invention.

FIGS. 3A, 3B and 3C are illustrations representing the shape and dimensions of a conventional lifting gas filled, unpressurized envelope of a second stage UABV balloon at ground, launching and operational altitudes.

FIG. 4 is an illustration of a powered embodiment of a second stage UABV platform having a pressurized, elongated, streamlined envelope.

DETAILED DESCRIPTION

Figure 1:
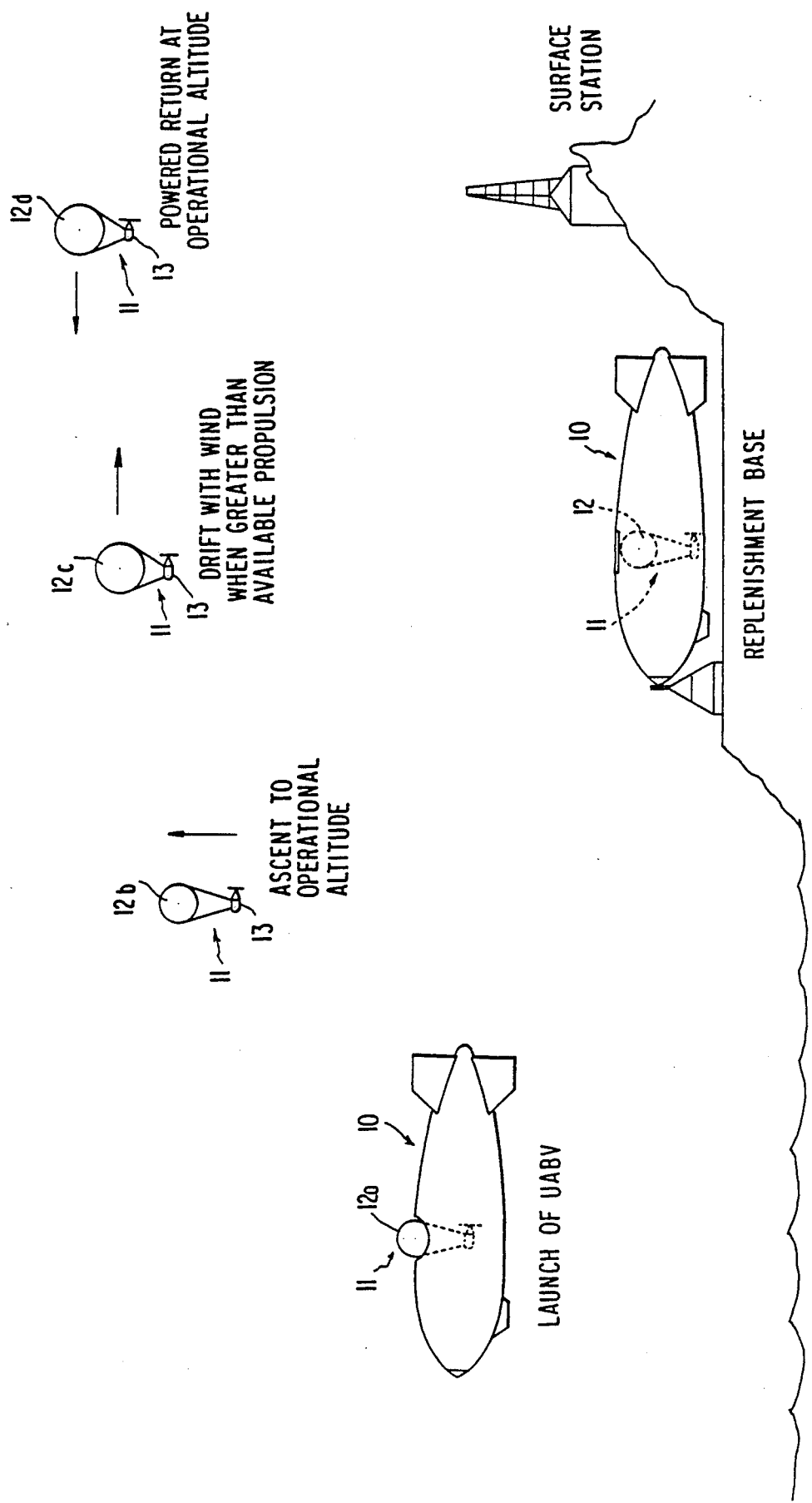

FIG. 1 schematically illustrates the phases of a representative two stage air-buoyant vehicle system of the invention in which the lower portion of FIG. 1 illustrates a first stage LABV airship 10 moored at a ground replenishment base with the second stage UABV platform 11 and its gas filled envelope 12 contained internally within the airship 10. The left portion of FIG. 1 illustrates a first stage LABV airship 10 at launching altitude in a level trim attitude at zero air speed with the second stage UABV platform 11 and its slightly expanded gas envelope 12a emerging through the upper surface of the LABV airship. To the right and above the illustration of the LABV 10 in its launching position, second stage UABV platforms 11 are respectively shown with expanding envelopes 12b, 12c and 12d ascending toward operational altitude, with the second stage UABV platform 11 and its fully expanded envelope 12d at the first right having reached float operational altitude with the powered thruster 13 propelling the second stage platform in the direction of the first stage LABV airship 10 at the launch altitude. The second stage UABV platform 11 of FIG. 1 is represented as being equipped with a powered thruster 13 and for simplicity of illustration the expanding gas filled envelope 12 is represented as being spherical with the sensor pay load platform and powered thruster 13 hanging below.

Since the function of the second stage UABV platform is to carry equipment that receives or transmits line-of-sight signals from or to distant sources or space information detected having a minimum of atmospheric distortion, its operational altitude must be in the stratospheric region as high as possible, preferably altitudes of at least 60,000 to 70,000 feet or even higher. Since the amount of lifting gas required of an aerostat (air-buoyant vehicle) to support a given weight at an operational float altitude must displace the weight of air that is displaced by the aerostat gas at its operational altitude, the amount of gas in the second stage UABV aerostat envelope is determined by the supported weight and the operational float altitude. Assuming the payload of a second stage high altitude UABV to be 0.54 of its gross weight, the expanded volume of the gas filled envelope of a second stage UABV carrying a 1000 lb. payload at a float altitude of 70,000 feet would be approximately 500,000 cubic feet. FIGS. 3, 3A and 3B illustrate the dimensional sizes at various altitudes from ground level of an aerostat envelope having a volume of 500,000 cubic feet at an altitude of 70,000 cubic feet and graphically illustrates the problems inherent in launching a spherical balloon capable of carrying 1,000 pounds to a 70,000 foot float altitude.

The function of the first stage lower air-buoyant vehicle (LABV) being to transport the second stage high altitude sensor supporting UABV platform to the launching altitude, a preferred embodiment of a first stage LABV is a manned airship of adequate size having structural provisions to carry one or more second stage UABV platforms from a ground station to a launching altitude and launch them under a no wind (zero airspeed) condition. The requirements of providing a large lifting capacity capable of reaching moderately high altitudes above ground turbulence and structural provisions for accomodating one or more second stage UABV platforms would best be filled by a rigid type airship structure comprising an elongated, streamlined truss structure within which separate gas cells are contained internally along its length and having an external cover over the truss structure. A semi-rigid or possibly a nonrigid type airship hull possibly might be utilized as the first stage LABV launcher for small and low payload capacity UABV platforms under some conditions and by utilizing new fiber reinforced composite material in the hull structure.

Figure 5D:
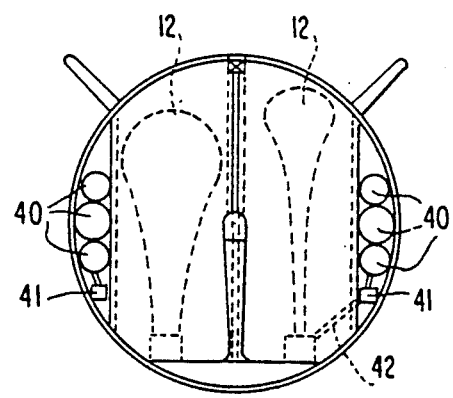
FIG. 5D is an alternate embodiment of the airship of FIG. 5A along the same section line as FIG. 5C.
Figure 5A:
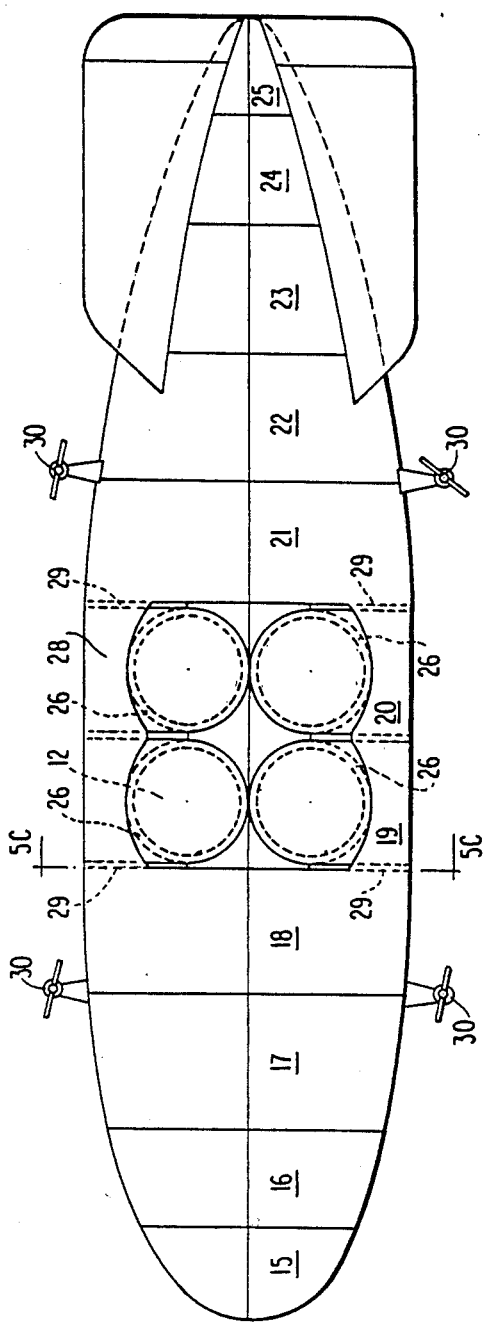
FIG. 5A is a plan view from above of an embodiment of a first stage LABV airship of a rigid type.
Figure 5B:
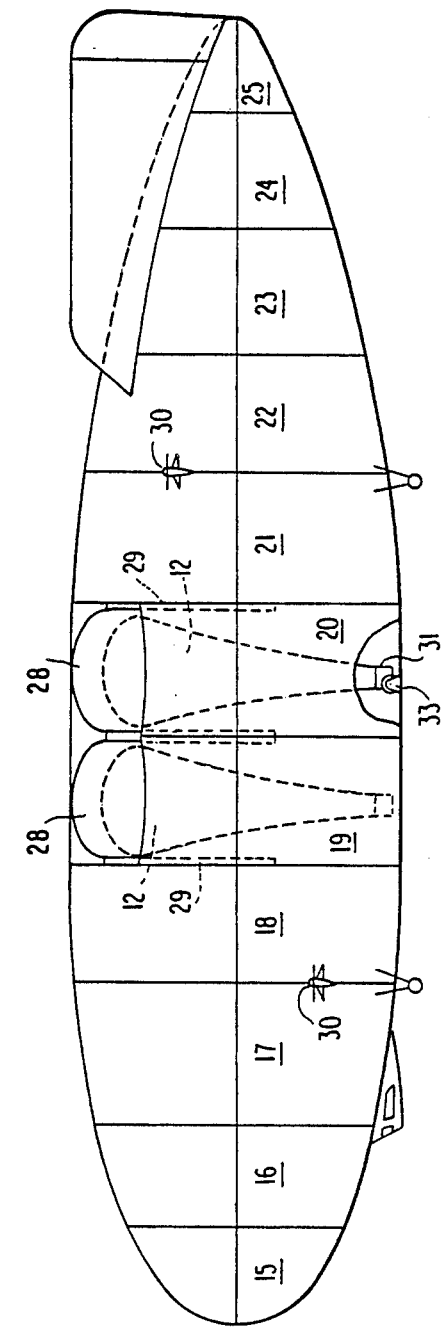
FIG. 5B is a side elevation view of the airship of FIG. 5B.
Figure 5C:
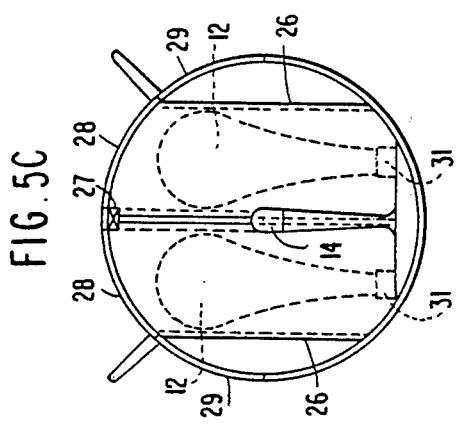
FIG. 5C is a front elevation section along section line 5C—5C of FIG. 5A.

FIGS. 5A, 5B and 5C illustrate a typical preferred embodiment of a first stage LABV rigid airship which can accomodate and transport a second stage UABV platform lifted by a spherical balloon having a volume in the size range illustrated in FIGS. 3A, 3B and 3C to a troposphere high launching altitude in the range of about 12,000 feet above most air turbulence where the second stage UABV platform can be launched under a zero relative wind condition. The first stage LABV airship 10 of FIGS. 5A, 5B and 5C is a rigid type airship, of which the U.S. Navy Akron and Macon or the German Hindenburg airships are representative and would have a gas cell volume displacement in the general range of these airships of about 7 million cubic feet or greater in order to carry UABV platforms of moderate size and payload to the launching altitude and have sufficient lift for carrying UABV-LABV data link equipment for acquistion and transmission of the data acquired by the UABV platform at high altitudes. These rigid type airships have a streamlined outer frame of longitudinally extended longerons along which a number of circumferentially extending truss ring frames are spaced apart to define bays in which helium (or hydrogen) gas cells are located, the entire frame structure being covered by a light weight material. For simplicity, FIGS. 5A, 5B and 5C do not illustrate the truss framework of the rigid airship 10, except for a central keel and walkway 14, and the respective ring frames between which are located the internal bays 15–25 that extend along the length of the airship. All bays except the two central bays 19, 20 contain conventional gas cells (not illustrated) which expand and contract within the bays with changes in altitude. The two central bays 19, 20 each contain a pair of cylindrical silos 26 on opposite sides of a central upper longeron 27. Each silo is of a dimension to contain a UABV balloon envelope 12 partially filled with a sufficient volume of lifting gas to reach its intended stratosphere operational altitude and to the bottom portion of which is attached the sensor payload 31. Each silo has a retractable top cover 28 that forms a portion of the airship cover when closed and is supported by a track 29 along which the silo cover is moveable between a closed position shown in FIGS. 5A, 5B and 5C to a retracted position 28a leaving the top of the silo open as illustrated in the silo installed in the bay 20 of FIG. 2. For convenience in loading and servicing the second stage UABV platforms at the ground replenishing station, provisions can be made for opening the bottom cover of the airship below the silos while on the ground.

Alternative to the multiple silo arrangement illustrated in FIGS. 2 and 5A, 5B and 5C, a single or dual silo could be incorporated in the airships structure with provisions for inflating the second stage UABV platform gas envelopes at altitude just prior to launch. This would entail storing helium in high pressure cyclinders next to or within the silo in which the second stage UABV envelope is inflated. This would have the advantage of providing a larger number of UABV platforms since the aerostat envelopes could be stored in an uninflated condition until the airship is airborne enroute to or has reached launching altitude at which time the UABV platforms could be assembled and gas envelopes inflated one at a time before being launched into the upper atmosphere. FIG. 5D is illustrative of such an alternative arrangement, high pressure helium containing cyclinders 40 being installed in the space outside each of the silos 26 with the cyclinders connected to a manifold 41 having a connection to a hose 42 inside the silo through which helium is fed to inflate the balloon envelope at launching altitude. FIG. 5D illustrates one balloon 12 sufficiently inflated for launching and the other in an initial stage of inflation. Alternatively, helium for filling the balloon envelope could be bled from gas cells, the provisions for which, involving transfer lines and pressure pumping devices, would be obvious to anyone of normal skill in the gas transfer art.

The ability to successfully launch UABV platforms having large volume gas envelopes is dependent upon launching the UABV platforms under minimal wind conditions, hence the first stage LABV airship launcher must be capable of maintaining a steady trim condition at close to a zero air speed for a sufficient period of time to launch the UABV platforms. Theoretically an airship can achieve this optimum condition for launching UABV platforms by establishing a level static trim condition and terminating propulsive power. However, sufficiently stable air conditions permitting a large airship to achieve this zero air speed launching condition, even at altitudes of about 12,000 feet, seldom exist and would require excessively long time launching operations. Therefore, the preferred embodiment of the LABV airship has provisions for establishing controlled vectored thrust forces along the 3 space axes of the degrees necessary to establish and maintain a level or optimum attitude and substantially zero airspeed during the period of launching the second stage UABV platforms. Several modes of achieving this are disclosed and discussed in U.S. Pat. No. 4,591,112 of a Vectored Thrust Airship issued to the applicant and incorporated herein by reference. A typical propulsive system of the general nature disclosed in the aforementioned patent for establishing the required vectored thrust in the airship 10 of FIGS. 5A and 5B comprises two pairs of rotor/propellers 30 mounted on either side ahead of and behind the center of buoyancy of the airship with the forward and after pairs of rotor/propellers being at different heights to avoid propeller wash effects between the forward and after rotor/propellers. Preferably the rotor/propellers 30 are driven by engines (not illustrated) mounted internally of the airship through drive shafts. The rotor/propellers 30 of one preferred embodiment are rotatable about a horizontal transverse axis them to enable them to provide thrust either vertically or horizontally or in any intermediate combination. Such a tilting system permits horizontal forward propulsion and retardation, vertical propulsion and pitch and yaw control by direct blade pitch change (collective pitch). The rotor/propellers preferrably also include cyclic pitch provisions in addition to collective pitch as a means of providing lateral side propulsion of the LABV airship and supplemental means of yaw control and vernier control of horizontal forward and rearward propulsion. Mounting the four rotor/propellers 30 such that their planes of rotation are tiltable between a horizontal plane and a vertical plane and incorporating provisions for both collective pitch control and cyclic pitch control in the blades provides means for establishing controllable vectored thrust to an optimum degree on the airship along all three axes in different degrees and magnitudes. This vectored thrust provides translational propulsion of the LABV airship along all three axes (horizontal propulsion and retardation, vertical propulsion and transverse sidewise propulsion) as well as attitude control in pitch, roll and yaw at all air speeds including zero as discussed and described in the cited patent of the applicant. The plane in which the blades of the rotor/propellers 30 in FIG. 2 and FIGS. 5A and 5B rotate is indicated to be horizontal since that would be the preferred position for establishing optimum thrust and attitude control at low or zero air speed. For high speed forward propulsion the rotor/propellers 30 would probably be tilted forward to provide maximum forward thrust. Alternatively, unshrouded or shrouded propellers rotating in vertical planes could be utilized for forward propulsion additionally to horizontal, pivotable rotor/propellers, particularly when the LABV airship is in a light static condition, in the manner of or variations of the auxiliary propellers described in U.S. Pat. No. 4,591,112. No detailed discussion or description of the controls required for actuating the rotor/propellers and the collective and cyclic pitch controls in providing the degree of vectored thrust necessary to establish full translational and attitude control of the LABV airship at all air speeds and attitudes and means for mounting the rotor/propellers for tilting their plane of rotation is required in view of the description set forth in the incorporated descriptions of U.S. Pat. No. 4,591,112. As is apparent from that patent, forward and rear translational motion of the LABV airship can be established either by rotor/propeller tilt or longitudinal cyclic pitch variations, height translational motion by simultaneous collective pitch variations, lateral translational motion by simultaneous lateral cyclic pitch variations, attitude pitch control is achieved by longitudinal collective pitch variations and/or differential rotor-propeller tilt, attitude yaw control by longitudinal differential cyclic or lateral differential cyclic variation and/or differential rotor-propeller tilt. Attitude control in roll probably would not be necessary due to inherent roll stability of an airship but can be obtained by lateral differential collective pitch variations or rotor/propeller tilt variations if desired.

Obviously a number of other alternate means can be incorporated in the airship 10 for establishing the required controllable vectored thrust forces on the airship to bring it close to a zero airspeed and optimum attitude for launching the second stage UABV platforms other than the one described above. For example, the propulsive system for the airship could comprise any number of conventional thrust producing units capable of propelling the aircraft in flight in conjunction with conventional stabilizing and control fins supplemented by jet or rocket units capable of establishing thrust forces along any of the 3 axis in space relative to the longitudinal axis of the airship ahead of and behind its center of buoyancy as will create total thrust forces on the airship of degrees and directions as will establish and maintain the airship at minimal airspeed and optimum attitude at launching altitude for launching a second stage UABV platform. Any further description of the various other means of establishing the required vector thrust on the first stage airship are unncessary as being well within the capabilities of those of normal skill in the aircraft art.

Figure 2:
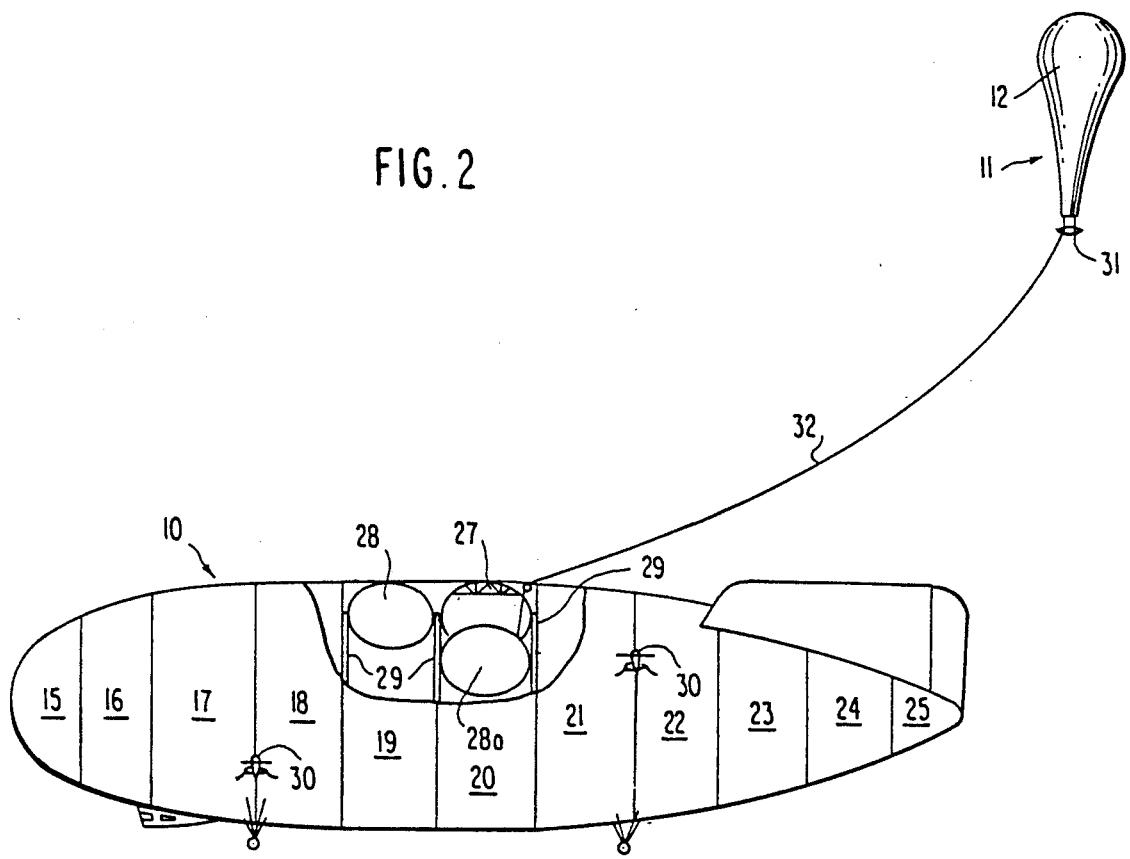
FIG. 2 is an illustration of an embodiment of the high altitude two stage vehicle launching system shortly after launching the second stage UABV platform from the first stage LABV airship at launching altitude.

The most simple and inexpensive second stage type of UABV platform would be a balloon 12 of natural shape (approximately spherical) of thin plastic material from which is supported a payload 31 of surveilance or sensory equipment as illustrated in FIG. 2. Preferably the balloon is a "super-pressure" type that reaches a normal internal pressure about twenty percent above ambient pressure at operational float altitudes so as to maintain a constant density altitude when cooling or being heated relative to ambient temperature. Alternatively, the balloons would have to be of suffiently large volume to carry a large supply of disposable ballast to compensate for heating and cooling effects at float altitude. The balloon type of UABV 11 could either be released at launch altitude as a free floating balloon to rise freely to operational altitude or could be connected to the first stage LABV airship by a tether line 32 as illustrated in FIG. 2. If desired an optic fiber could be incorporated in the tether line 32 for transmitting data from the UABV platform to the LABV airship. A further alternate would be to equip the UABV platform 11 with a thruster for quasi-control from the LABV airship 10, power possibly being supplied from the LABV airship to the thruster through a tether line 32. To reduce weight of the high altitude platform system intermediate balloons (not illustrated) could be attached at intervals along a tether line as it is released from the launch silo. By increasing thrust and speed of the LABV airship after launching the tethered second stage UABV platform to match the upper wind airspeeds through which the UABV platform is ascending, the first stage LABV airship could keep station immediately below a tethered second stage UABV platform as it rises to operational float altitude. If a tethered line 32 is utilized provisions can be made for transferring it from the LABV airship to a ground station. A tether line 32 would be stored and paid out from a winch 33 installed in the silo of the LABV airship as illustrated in FIG. 5B thus making it possible to winch back a tethered UABV platform if desired.

Inasmuch as the drag of a spherical body is ten times as great as that of an elongated, streamlined body of the same volume, a self propelled second stage UABV platform capable of moderate airspeed preferably would be configured to have a streamlined shape at its float operational altitude. FIG. 4 illustrates such a self propelled second stage UABV 34 at operational altitude in which the elongated, streamlined gas filled envelope 35 propelled by a rear mounted propeller 36 carries the payload of sensor equipment 37 along a desired high altitude flight path. Propulsive power can be supplied by solar cells 38 arranged along the top of the UABV envelope, supplied through a tether line 39, or be a self contained power system in the UABV platform. The shape and configuration of an internal silo within the first stage LABV airship for transporting a streamlined UABV platform would be adapted to the shape and size of the powered UABV platform. Due to its length to diameter ratio a powered, streamlined UABV platform of the nature of the one illustrated in FIG. 4 preferably would be stored vertically in the silo of an LABV airship, arranging the forward portion of the envelope 35 in pleats at the lower altitude if necessary to reduce its overall length within the launching silo. A powered UABV platform of the shape illustrated in FIG. 4 and having air ballonets within the envelope to maintain its streamlined shape at all altitudes could be stored and transported to launching altitude externally on the top of a first stage LABV airship.

The relationship between the LABV airship and the high altitude UABV platform after launch and during ascent can vary dependent upon whether the second stage UABV platform is free floating, is tethered or self powered. If the UABV platform is tethered, as it rises to higher altitudes where the wind velocities are different from launch altitude the tether line will be pulled away from the LABV airship. The launching LABV airship can change speed and direction in anticipation of this leaning of the tether or can resist it. Under certain wind conditions the tether can be retained during ascent and then released upon the UABV platform reaching operational float altitude. A tethered UABV platform can be retrieved by winching it back and an untethered one can be retrieved by valving lifting gas for recovery at ground level or by the LABV with an airborne snatch system that attaches to a tether line hanging from the UABV platform as it descends or is an adaptation of an airplane trapeze recovery system as installed on the U.S. Navy airships Akron and Maron, the vectored thrust provisions on the LABV airship assisting in any airborne recovery. Whereas a self powered UABV platform would be considerably larger and complex and require more elaborate storage facilities in the LABV airship than one in which a simple spherical, light plastic balloon is utilized, a much more controllable relationship between the two stages of the system could be maintained after launch. The multitude of different procedures for maintaining a communication relationship between the second stage UABV platform and the first stage LABV airship or a ground station after launch and while the UABV platform reaches operational float altitude are readily apparent to those of average skill and are largely dependent upon the nature and configuration of the second stage, high altitude UABV platform.

It should be understood that the foregoing disclosure relates only to some typical embodiments of the invention and that numerous modifications or alterations may be made therein without departing from the spirit and scope of the invention as set forthe in the appendant claims.

What is claimed is:

1. A two stage stratosphere altitude data acquisition system comprising a first and a second air-buoyant vehicle, said first vehicle comprising lighter-than-air gas containing means, data acquisition means, flight associated items and means supportingly affixing said data acquisition means and associated items to said gas containing means, said gas containing means being expandable to a volume as will displace an amount of air at a stratosphere float altitude equal to the weight of said first vehicle and containing an amount of lighter-than-air gas as will displace said volume of air at said stratosphere float altitude equal to the weight of said first vehicle, said second vehicle comprising a lighter-than-air aircraft having control and propulsive means for controlled flight operations of said aircraft at troposphere altitudes, releasable retaining means for retention of said first vehicle by said aircraft, said retaining means being operable from a vehicle retaining position to a position releasing said first vehicle from retention by and free of said aircraft at a selected troposphere launching altitude, said aircraft propulsive means including means creating vectored thrust forces of directions and amounts as establishes said aircraft in a level flight condition of substantially zero air speed, whereby said first vehicle can be launched from said aircraft into the troposphere under an essentially no wind condition for ascension to said stratosphere float altitude upon establishing said retaining means in said releasing position.

2. The data acquisition system of claim 1 wherein said aircraft propulsive means includes means for establishing controllable thrust forces directable selectively in any of the directions corresponding to the longitudinal axis, the normal axis and the transverse axis of said aircraft.

3. The data acquisition system of claim 2 wherein said aircraft propulsive means comprises two pairs of engine powered rotor type propellers having controllable pitch blades, said rotor type propellers each being mounted on said aircraft by means for rotating each said rotor type propeller between a first position in which the plane of rotation of said rotor type propeller is parallel with said aircraft longitudinal axis and a second position in which said rotor type propeller plane of rotation is normal to said aircraft longitudinal axis, a first pair of said rotor type propellers being mounted on opposite sides of said aircraft ahead of the center of buoyancy of said aircraft and a second pair of said rotor type propellers being mounted on opposite sides of said aircraft rearwardly of said aircraft center of buoyancy, and means for collectively controlling the blade pitch of said rotor type propeller controllable pitch blades and for rotatively positioning said rotor type propellers at a selected position between said first and second positions.

4. The data acquisition system of claim 3 additionally including means for cyclically controlling the blade pitch of said rotor type propeller controllable pitch blades.

5. The data acquisition system of claim 4 wherein said propulsive means additionally includes at least one pair of engine powered auxiliary propellers having controllable pitch blades and mounted on opposite sides of said aircraft with the plane of rotation of said auxiliary propellers normal to said aircraft longitudinal axis and means for collectively controlling the blade pitch of said auxiliary propeller controllable pitch blades.

6. The data acquisition system of claim 2 wherein said propulsive means comprises two pairs of engine powered rotor type propellers having controllable pitch blades and mounted on said aircraft with the plane of rotation of said rotor type propellers parallel with said aircraft longitudinal axis and at least one engine powered auxiliary propeller having controllable pitch blades and mounted on said aircraft with the plane of rotation of said auxiliary propeller normal to said aircraft longitudinal axis, a first pair of said rotor type propellers being mounted on opposite sides of said aircraft ahead of the center of buoyancy of said aircraft and a second pair of said rotor/propellers being mounted on opposite sides of said aircraft rearward of said aircraft center of buoyancy, and means for collectively controlling the blade pitch of said rotor type propeller controllable pitch blades and the blade pitch of said auxiliary propeller controllable pitch blades.

7. The data acquisition system of claim 6 additionally including means for cyclically controlling the blade pitch of said rotor type propellers.

8. The data acquisition system of claim 1 wherein said aircraft is a rigid type airship having an elongated, streamlined truss frame structure within an outer cover with a plurality of bays defined between circumferentially extending ring frames spaced apart lengthwise of the airship structure, at least one of said bays containing a silo adapted to retain therewithin at least one of said first vehicles for transportation to said troposphere launching altitude and other of said bays containing expandable lifting gas cells, said silo having top closure means moveable between a closed position establishing an outer cover extending across a top portion of said silo and a retracted position exposing said silo top portion and a first vehicle contained therewithin to the troposphere, means for moving said top closure means between said closed and retracted positions, and retention-releasing means for retaining said first vehicle within said silo and releasing said first vehicle for ascension from said silo through said silo top open portion when said closure means is in said retracted position.

9. The data acquisition system of claim 2 wherein said aircraft is a rigid type airship having an elongated, streamlined truss frame structure within an outer cover with a plurality of bays defined between circumferentially extending ring frames spaced apart lengthwise of the airship structure, at least one of said bays containing a silo adapted to retain therewithin at least one of said first vehicles for transportation to said troposphere launching altitude and other of said bays containing expandable lifting gas cells, said silo having top closure means moveable between a closed position establishing an outer cover extending across a top portion of said silo and a retracted position exposing said silo top portion and a first vehicle contained therewithin to the troposphere, means for moving said top closure means between said closed and retracted positions, and retention-releasing means for retaining said first vehicle within said silo and releasing said first vehicle for ascension from said silo through said silo top open portion when said closure means is in said retracted position.

10. The data acquisition system of claim 9 wherein said aircraft propulsive means comprises two pairs of engine powered rotor type propellers having controllable pitch blades, said rotor type propellers each being mounted on said aircraft by means for rotating each said rotor type propeller between a first position in which the plane of rotation of said rotor type propeller is parallel with said aircraft longitudinal axis and a second position in which said rotor type propeller plane of rotation is normal to said aircraft longitudinal axis, a first pair of said rotor type propellers being mounted on opposite sides of said aircraft ahead of the center of buoyancy of said aircraft and a second pair of said rotor type propellers being mounted on opposite sides of said aircraft rearwardly of said aircraft center of buoyancy, and means for collectively controlling the blade pitch of said rotor type propeller controllable pitch blades and for rotatively positioning said rotor type propellers at a selected position between said first and second positions.

11. The data acquisition system of claim 10 additionally including means for cyclically controlling the blade pitch of said rotor type propeller controllable pitch blades.

12. The data acquisition system of claim 11 wherein said propulsive means additionally includes at least one pair of engine powered auxiliary propellers having controllable pitch blades and mounted on opposite sides of said aircraft with the plane of rotation of said auxiliary propellers normal to said aircraft longitudinal axis and means for collectively controlling the blade pitch of said auxiliary propeller controllable pitch blades.

13. The data acquisition system of claim 12 wherein said propulsive means comprises two pairs of engine powered rotor type propellers having controllable pitch blades and mounted on said aircraft with the plane of rotation of said rotor type propellers parallel with said aircraft longitudinal axis and at least one engine powered auxiliary propeller having controllable pitch blades and mounted on said aircraft with the plane of rotation of said auxiliary propeller normal to said aircraft longitudinal axis, a first pair of said rotor type propellers being mounted on opposite sides of said aircraft ahead of the center of buoyancy of said aircraft and a second pair of said rotor/propellers being mounted on opposite sides of said aircraft rearward of said aircraft center of buoyancy, and means for collectively controlling the blade pitch of said rotor type propeller controllable pitch blades and the blade pitch of said auxiliary propeller controllable pitch blades.

14. The data acquisition system of claim 13 additionally including means for cyclically controlling the blade pitch of said rotor type propellers.

15. A two stage stratosphere altitude data acquisition system comprising a first and a second air-buoyant vehicle, said first vehicle comprising lighter-than-air gas containing means, data acquisition means, associated flight related items and means supportingly affixing said data acquisition means and associated items to said gas containing means, said gas containing means being expandable to a volume displacing an amount of air at a stratosphere float altitude equal to the weight of said first vehicle, said second vehicle comprising a lighter-than-air aircraft having control and propulsive means for controlled flight operations of said aircraft at troposphere altitudes, means for retaining said first vehicle by said aircraft and operable between a position retaining said first vehicle and a position releasing said first vehicle free of said aircraft at a troposphere launching altitude, a supply of said lighter-than-air gas, means connecting said lighter-than-air gas supply to said expandable gas containing means and establishing the transfer of a sufficient amount of said gas from said supply into said expandable gas containing means as will displace said volume of air at said stratosphere float altitude equal to the weight of said first vehicle, said aircraft propulsive means including means for establishing controllable thrust forces directable selectively in any of the directions corresponding to the longitudinal axis, the normal axis and the transverse axis of said aircraft of directions and amounts as establishes said aircraft in a level flight condition of substantially zero airspeed, whereby said first vehicle can be launched from said aircraft into the troposphere under an essentially no wind condition for ascension to said stratosphere float altitude upon establishing said retaining means to said releasing position.

16. The data acquisition system of claim 15 wherein said aircraft propulsive means comprises two pairs of engine powered rotor type propellers having controllable pitch blades, said rotor type propellers each being mounted on said aircraft by means for rotating each said rotor type propeller between a first position in which the plane of rotation of said rotor type propeller is parallel with said aircraft longitudinal axis and a second position in which said rotor type propeller plane of rotation is normal to said aircraft longitudinal axis, a first pair of said rotor type propellers being mounted on opposite sides of said aircraft ahead of the center of buoyancy of said aircraft and a second pair of said rotor type propellers being mounted on opposite sides of said aircraft rearwardly of said aircraft center of buoyancy, and means for collectively controlling the blade pitch of said rotor type propeller controllable pitch blades and for rotatively positioning said rotor type propellers at a selected position between said first and second positions.

17. The data acquisition system of claim 16 additionally including means for cyclically controlling the blade pitch of said rotor type propeller controllable pitch blades.

18. The data acquisition system of claim 17 wherein said propulsive means additionally includes at least one pair of engine powered auxiliary propellers having controllable pitch blades and mounted on opposite sides of said aircraft with the plane of rotation of said auxiliary propellers normal to said aircraft longitudinal axis and means for collectively controlling the blade pitch of said auxiliary propeller controllable pitch blades.

19. The data acquisition system of claim 15 wherein said propulsive means comprises two pairs of engine powered rotor type propellers having controllable pitch blades and mounted on said aircraft with the plane of rotation of said rotor type propellers parallel with said aircraft longitudinal axis and at least one engine powered auxiliary propeller having controllable pitch blades and mounted on said aircraft with the plane of rotation of said auxiliary propeller normal to said aircraft longitudinal axis, a first pair of said rotor type propellers being mounted on opposite sides of said aircraft ahead of the center of buoyancy of said aircraft and a second pair of said rotor/propellers being mounted on opposite sides of said aircraft rearward of said aircraft center of buoyancy, and means for collectively controlling the blade pitch of said rotor type propeller controllable pitch blades and the blade pitch of said auxiliary propeller controllable pitch blades.

20. The data acquisition system of claim 19 additionally including means for cyclically controlling the blade pitch of said rotor type propellers.

21. The data acquisition system of claim 15 wherein said aircraft is a rigid type airship having an elongated, streamlined truss frame structure within an outer cover with a plurality of bays defined between circumferentially extending ring frames spaced apart lengthwise of the airship structure, at least one of said bays containing a silo adapted to retain therewithin at least one of said first vehicles for transportation to said troposphere launching altitude and other of said bays containing expandable lifting gas cells, said silo having top closure means moveable between a closed position establishing an outer cover extending across a top portion of said silo and a retracted position exposing said silo top portion and a first vehicle contained therewithin to the troposphere, means for moving said top closure means between said closed and retracted positions, and retention-releasing means for retaining said first vehicle within said silo and releasing said first vehicle for ascension from said silo through said silo top open portion when said closure means is in said retracted position.

22. The data acquisition system of claim 21 wherein said aircraft propulsive means comprises two pairs of engine powered rotor type propellers having controllable pitch blades, said rotor type propellers each being mounted on said aircraft by means for rotating each said rotor type propeller between a first position in which the plane of rotation of said rotor type propeller is parallel with said aircraft longitudinal axis and a second position in which said rotor type propeller plane of rotation is normal to said aircraft longitudinal axis, a first pair of said rotor type propellers being mounted on opposite sides of said aircraft ahead of the center of buoyancy of said aircraft and a second pair of said rotor type propellers being mounted on opposite sides of said aircraft rearwardly of said aircraft center of buoyancy, and means for collectively controlling the blade pitch of said rotor type propeller controllable pitch blades and for rotatively positioning said rotor type propellers at a selected position between said first and second positions.

23. The data acquisition system of claim 22 additionally including means for cyclically controlling the blade pitch of said rotor type propeller controllable pitch blades.

24. The data acquisition system of claim 23 wherein said propulsive means additionally includes at least one pair of engine powered auxiliary propellers having controllable pitch blades and mounted on opposite sides of said aircraft with the plane of rotation of said auxiliary propellers normal to said aircraft longitudinal axis and means for collectively controlling the blade pitch of said auxiliary propeller controllable pitch blades.

25. The data acquisition system of claim 21 wherein said propulsive means comprises two pairs of engine powered rotor type propellers having controllable pitch blades and mounted on said aircraft with the plane of rotation of said rotor type propellers parallel with said aircraft longitudinal axis and at least one engine powered auxiliary propeller having controllable pitch blades and mounted on said aircraft with the plane of rotation of said auxiliary propeller normal to said aircraft longitudinal axis, a first pair of said rotor type propellers being mounted on opposite sides of said aircraft ahead of the center of buoyancy of said aircraft and a second pair of said rotor/propellers being mounted on opposite sides of said aircraft rearward of said aircraft center of buoyancy, and means for collectively controlling the blade pitch of said rotor type propeller controllable pitch blades and the blade pitch of said auxiliary propeller controllable pitch blades.

26. The data acquisition system of claim 25 additionally including means for cyclically controlling the blade pitch of said rotor type propellers.

27. An aircraft for launching at troposphere altitudes an air-buoyant vehicle of stratosphere altitude attaining capability statically sustained at a stratosphere float altitude by lighter-than-air gas contained in an expandable envelope of said vehicle, said envelope containing a quantity of lighter-than-air gas sufficient to displace a volume of air at said stratosphere float altitude equal to the weight of said vehicle, said aircraft comprising a lighter-than-air rigid type airship having an elongated, streamlined truss frame structure within an outer cover with a plurality of bays defined between circumferentially extended ring frames of said structure spaced apart lengthwise of the airship structure and control and propulsive means for operating said airship in flight at troposphere altitudes, at least one of said bays containing a silo adapted to retain therewithin at least one of said air-buoyant vehicles and other of said bays containing expandable lifting gas cells, said silo having top closure means moveable between a closed position establishing an outer cover extending across a top portion of said silo and a retracted position exposing said silo top portion and an air buoyant vehicle contained therewithin to the troposphere, means moving said silo top closure means between said closed and retracted positions, and retention-releasing means for retaining said air buoyant vehicle within said silo and releasing said first vehicle for ascension from said silo through said silo top open portion when said closure means is in said retracted position.

28. The aircraft of claim 27 wherein said airship propulsive system includes means for establishing controllable vectored thrust forces directable selectively in any of the directions corresponding to the longitudinal axis, the normal axis and the transverse axis of said airship of degrees required to maintain said airship at a minimal airspeed and optimum attitude required for releasing an air buoyant vehicle from within said silo.

29. The aircraft of claim 28 wherein said aircraft propulsive means comprises two pairs of engine powered rotor type propellers having controllable pitch blades, said rotor type propellers each being mounted on said aircraft by means for rotating each said rotor type propeller between a first position in which the plane of rotation of said rotor type propeller is parallel with said aircraft longitudinal axis and a second position in which said rotor type propeller plane of rotation is normal to said aircraft longitudinal axis, a first pair of said rotor type propellers being mounted on opposite sides of said aircraft ahead of the center of buoyancy of said aircraft and a second pair of said rotor type propellers being mounted on opposite sides of said aircraft rearwardly of said aircraft center of buoyancy, and means for collectively controlling the blade pitch of said rotor type propeller controllable pitch blades and for rotatively positioning said rotor type propellers at a selected position between said first and second positions.

30. The aircraft of claim 29 additionally including means for cyclically controlling the blade pitch of said rotor type propeller controllable pitch blades.

31. The aircraft of claim 30 wherein said propulsive means additionally includes at least one pair of engine powered auxiliary propellers having controllable pitch blades and mounted on opposite sides of said aircraft with the plane of rotation of said auxiliary propellers normal to said aircraft longitudinal axis and means for collectively controlling the blade pitch of said auxiliary propeller controllable pitch blades.

32. The aircraft of claim 28 wherein said propulsive means comprises two pairs of engine powered rotor type propellers having controllable pitch blades and mounted on said aircraft with the plane of rotation of said rotor type propellers parallel with said aircraft longitudinal axis and at least one engine powered auxiliary propeller having controllable pitch blades and mounted on said aircraft with the plane of rotation of said auxiliary propeller normal to said aircraft longitudinal axis, a first pair of said rotor type propellers being mounted on opposite sides of said aircraft ahead of the center of buoyancy of said aircraft and a second pair of said rotor/propellers being mounted on opposite sides of said aircraft rearward of said aircraft center of buoyancy, and means for collectively controlling the blade pitch of said rotor type propeller controllable pitch blades and the blade pitch of said auxiliary propeller controllable pitch blades.

33. The aircraft of claim 32 additionally including means for cyclically controlling the blade pitch of said rotor type propellers.

34. A method of launching an air-buoyant vehicle of stratosphere altitude attaining capabilities statically sustained at a stratosphere float altitude by ligher-than-air gas contained within an expandable envelope of said vehicle, said method comprising retaining said vehicle and its expandable envelope within a compartment interiorly of a lighter-than-air aircraft, said compartment having a top section comprising a portion of the upper exterior surface of said aircraft, at a ground level altitude introducing into said retained envelope a quantity of said lighter-than-air gas sufficient to displace a volume of air at said stratosphere float altitude equal to the weight of said air-buoyant vehicle, flying said aircraft with said retained vehicle and its gas containing envelope to an upper troposphere launching altitude, maneuvering said aircraft into a level flight condition of minimal airspeed at said launching altitude, establishing an opening in said compartment top section of a size as accommodates the passage through said opening of said vehicle and its gas containing envelope and releasing retention of said vehicle freeing said vehicle for ascension through said opening into the troposphere for further ascent to said stratosphere float altitude.

35. A method of launching an air-buoyant vehicle of stratosphere altitude attaining capabilities statically sustained at a stratosphere float altitude by lighter-than-air gas contained within an expandable envelope of said vehicle, said method comprising storing said vehicle and its expandable envelope within a compartment interiorly of a lighter-than-air aircraft, said compartment having a top section comprising a portion of the upper exterior surface of said aircraft, propelling said aircraft with said stored vehicle and envelope in flight to an upper troposphere launching altitude, during said flight introducing into said stored envelope a quantity of said lighter-than-air gas sufficient to displace a volume of air at said stratosphere float altitude equal to the weight of said air-buoyant vehicle, manuevering said aircraft into a level flight of minimal airspeed at said launching altitude, establishing an opening in said compartment top section of a size to accommodate the passage through said opening of aid vehicle and its gas containing envelope and releasing said stored vehicle and gas containing envelope for ascension through said opening into the troposphere for further ascent to said stratosphere float altitude.

* * * * *